(12) United States Patent
Shin

(10) Patent No.: US 8,219,573 B2
(45) Date of Patent: Jul. 10, 2012

(54) TEST CASE GENERATION APPARATUS, GENERATION METHOD THEREFOR, AND PROGRAM STORAGE MEDIUM

(75) Inventor: Hiromasa Shin, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 798 days.

(21) Appl. No.: 12/397,602

(22) Filed: Mar. 4, 2009

(65) Prior Publication Data

US 2009/0271139 A1    Oct. 29, 2009

(30) Foreign Application Priority Data

Apr. 28, 2008    (JP) .................................. 2008-117173

(51) Int. Cl.
G06F 17/30    (2006.01)

(52) U.S. Cl. .......... 707/758; 702/108; 702/124; 714/48; 717/115

(58) Field of Classification Search ................... 717/125, 717/127, 131; 714/38, 48; 702/108, 124; 707/758
See application file for complete search history.

(56) References Cited

U.S. PATENT DOCUMENTS

| | | | |
|---|---|---|---|
| 6,557,119 B1 * | 4/2003 | Edwards et al. | 714/38.12 |
| 6,675,125 B2 * | 1/2004 | Bizjak | 702/179 |

* cited by examiner

*Primary Examiner* — Phong Nguyen
*Assistant Examiner* — Mohammad Kabir
(74) *Attorney, Agent, or Firm* — Turocy & Watson, LLP

(57) ABSTRACT

A method of the present invention includes: inputting a state transition diagram that represents first transitions between a plurality of states; inputting a mapping function that maps a given state to a value within a certain range; mapping each of the states with the mapping function to obtain mapping values, and perform grouping of the states into a plurality of groups based on the mapping values; for each of pairs of two groups obtained by combining two of the groups, setting a second transition from one group of the two groups to the other group when there is at least one first transition between therein; generating a representative transition path which is a sequence of the second transitions by tracing sequentially the second transitions; converting the representative transition path to a transition path in the state transition diagram; outputting the transition path as the test case.

7 Claims, 14 Drawing Sheets

TABLE 1: STATE TABLE

| SID | STATE | MAPPING RESULT |
|---|---|---|
| s0 | ((RUN (1)) (RDY (2 3)) (WAI ())) | (1 2 0) |
| s1 | ((RUN (2)) (RDY (3)) (WAI (1))) | (1 1 1) |
| s2 | ((RUN (2)) (RDY (3 1)) (WAI ())) | (1 2 0) |
| s3 | ((RUN (3)) (RDY (1)) (WAI (2))) | (1 1 1) |
| s4 | ((RUN (3)) (RDY (1 2)) (WAI ())) | (1 2 0) |
| s5 | ((RUN (3)) (RDY ()) (WAI (1 2))) | (1 0 2) |
| s6 | ((RUN (3)) (RDY (2)) (WAI (1))) | (1 1 1) |
| s7 | ((RUN (1)) (RDY (2)) (WAI (3))) | (1 1 1) |
| s8 | ((RUN (1)) (RDY ()) (WAI (2 3))) | (1 0 2) |
| s9 | ((RUN (1)) (RDY (3)) (WAI (2))) | (1 1 1) |
| s10 | ((RUN (2)) (RDY (1 3)) (WAI ())) | (1 2 0) |
| s11 | ((RUN (2)) (RDY ()) (WAI (1 3))) | (1 0 2) |
| s12 | ((RUN ()) (RDY ()) (WAI (1 2 3))) | (0 0 3) |
| s13 | ((RUN (2)) (RDY (1)) (WAI (3))) | (1 1 1) |
| s14 | ((RUN (3)) (RDY (2 1)) (WAI ())) | (1 2 0) |
| s15 | ((RUN (1)) (RDY (3 2)) (WAI ())) | (1 2 0) |

FIG. 8

TABLE 2: TRASITION TABLE

| TID | SID0 | SID1 | EVENT |
|---|---|---|---|
| t0 | s0 | s1 | ((sleep 1) ()) |
| t1 | s0 | s2 | ((yield 1) ()) |
| t2 | s2 | s3 | ((sleep 2) ()) |
| t3 | s2 | s4 | ((yield 2) ()) |
| t4 | s1 | s4 | ((wakeup 2 1) ()) |
| t5 | s1 | s5 | ((sleep 2) ()) |
| t6 | s1 | s6 | ((yield 2) ()) |
| t7 | s4 | s7 | ((sleep 3) ()) |
| t8 | s4 | s0 | ((yield 3) ()) |
| t9 | s3 | s0 | ((wakeup 3 2) ()) |
| t10 | s3 | s8 | ((sleep 3) ()) |
| t11 | s3 | s9 | ((yield 3) ()) |
| t12 | s6 | s10 | ((wakeup 3 1) ()) |
| t13 | s6 | s11 | ((sleep 3) ()) |
| t14 | s6 | s1 | ((yield 3) ()) |
| t15 | s5 | s1 | ((wakeup 3 2) ()) |
| t16 | s5 | s9 | ((wakeup 3 1) ()) |
| t17 | s5 | s12 | ((sleep 3) ()) |
| t18 | s5 | s5 | ((yield 3) ()) |
| t19 | s7 | s2 | ((wakeup 1 3) ()) |
| t20 | s7 | s11 | ((sleep 1) ()) |
| t21 | s7 | s13 | ((yield 1) ()) |
| t22 | s9 | s14 | ((wakeup 1 2) ()) |
| t23 | s9 | s5 | ((sleep 1) ()) |
| t24 | s9 | s3 | ((yield 1) ()) |
| t25 | s8 | s3 | ((wakeup 1 3) ()) |
| t26 | s8 | s13 | ((wakeup 1 2) ()) |
| t27 | s8 | s12 | ((sleep 1) ()) |
| t28 | s8 | s8 | ((yield 1) ()) |
| t29 | s11 | s6 | ((wakeup 2 3) ()) |
| t30 | s11 | s7 | ((wakeup 2 1) ()) |
| t31 | s11 | s12 | ((sleep 2) ()) |
| t32 | s11 | s11 | ((yield 2) ()) |
| t33 | s10 | s9 | ((sleep 2) ()) |
| t34 | s10 | s15 | ((yield 2) ()) |
| t35 | s13 | s15 | ((wakeup 2 3) ()) |
| t36 | s13 | s8 | ((sleep 2) ()) |
| t37 | s13 | s7 | ((yield 2) ()) |
| t38 | s14 | s13 | ((sleep 3) ()) |
| t39 | s14 | s10 | ((yield 3) ()) |
| t40 | s15 | s6 | ((sleep 1) ()) |
| t41 | s15 | s14 | ((yield 1) ()) |

FIG. 9

TABLE 3: TRANSITION PATH

| TID | SID0 | SID1 | EVENT |
|---|---|---|---|
| t0 | s0 | s1 | ((sleep 1) ()) |
| t5 | s1 | s5 | ((sleep 2) ()) |
| t18 | s5 | s5 | ((yield 3) ()) |
| t16 | s5 | s9 | ((wakeup 3 1) ()) |
| t23 | s9 | s5 | ((sleep 1) ()) |
| t17 | s5 | s12 | ((sleep 3) ()) |
| break | | | |
| t1 | s0 | s2 | ((yield 1) ()) |
| t2 | s2 | s3 | ((sleep 2) ()) |
| t10 | s3 | s8 | ((sleep 3) ()) |
| t28 | s8 | s8 | ((yield 1) ()) |
| t27 | s8 | s12 | ((sleep 1) ()) |
| break | | | |
| t0 | s0 | s1 | ((sleep 1) ()) |
| t6 | s1 | s6 | ((yield 2) ()) |
| t13 | s6 | s11 | ((sleep 3) ()) |
| t30 | s11 | s7 | ((wakeup 2 1) ()) |
| t20 | s7 | s11 | ((sleep 1) ()) |
| t32 | s11 | s11 | ((yield 2) ()) |
| t31 | s11 | s12 | ((sleep 2) ()) |
| break | | | |
| t0 | s0 | s1 | ((sleep 1) ()) |
| t5 | s1 | s5 | ((sleep 2) ()) |
| t15 | s5 | s1 | ((wakeup 3 2) ()) |
| t6 | s1 | s6 | ((yield 2) ()) |
| t12 | s6 | s10 | ((wakeup 3 1) ()) |
| t34 | s10 | s15 | ((yield 2) ()) |
| t41 | s15 | s14 | ((yield 1) ()) |
| t38 | s14 | s13 | ((sleep 3) ()) |
| t37 | s13 | s7 | ((yield 2) ()) |
| t21 | s7 | s13 | ((yield 1) ()) |
| t35 | s13 | s15 | ((wakeup 2 3) ()) |
| t40 | s15 | s6 | ((sleep 1) ()) |
| t13 | s6 | s11 | ((sleep 3) ()) |
| t29 | s11 | s6 | ((wakeup 2 3) ()) |
| t14 | s6 | s1 | ((yield 3) ()) |
| t4 | s1 | s4 | ((wakeup 2 1) ()) |
| t7 | s4 | s7 | ((sleep 3) ()) |
| t19 | s7 | s2 | ((wakeup 1 3) ()) |
| t3 | s2 | s4 | ((yield 2) ()) |
| t8 | s4 | s0 | ((yield 3) ()) |
| t1 | s0 | s2 | ((yield 1) ()) |
| t2 | s2 | s3 | ((sleep 2) ()) |
| t10 | s3 | s8 | ((sleep 3) ()) |
| t26 | s8 | s13 | ((wakeup 1 2) ()) |
| t36 | s13 | s8 | ((sleep 2) ()) |
| t25 | s8 | s3 | ((wakeup 1 3) ()) |
| t11 | s3 | s9 | ((yield 3) ()) |
| t22 | s9 | s14 | ((wakeup 1 2) ()) |
| t39 | s14 | s10 | ((yield 3) ()) |
| t33 | s10 | s9 | ((sleep 2) ()) |
| t24 | s9 | s3 | ((yield 1) ()) |
| t9 | s3 | s0 | ((wakeup 3 2) ()) |
| break | | | |

FIG. 10

TABLE 4: STATE TABLE (RESIDUAL)

| [SID] | SID | STATE | MAPPING RESULT |
|---|---|---|---|
| s0 | s0 | ((RUN (1)) (RDY (2 3)) (WAI ())) | (1 2 0) |
| s0 | s2 | ((RUN (2)) (RDY (3 1)) (WAI ())) | (1 2 0) |
| s0 | s4 | ((RUN (3)) (RDY (1 2)) (WAI ())) | (1 2 0) |
| s0 | s10 | ((RUN (2)) (RDY (1 3)) (WAI ())) | (1 2 0) |
| s0 | s14 | ((RUN (3)) (RDY (2 1)) (WAI ())) | (1 2 0) |
| s0 | s15 | ((RUN (1)) (RDY (3 2)) (WAI ())) | (1 2 0) |
| s1 | s1 | ((RUN (2)) (RDY (3)) (WAI (1))) | (1 1 1) |
| s1 | s3 | ((RUN (3)) (RDY (1)) (WAI (2))) | (1 1 1) |
| s1 | s6 | ((RUN (3)) (RDY (2)) (WAI (1))) | (1 1 1) |
| s1 | s7 | ((RUN (1)) (RDY (2)) (WAI (3))) | (1 1 1) |
| s1 | s9 | ((RUN (1)) (RDY (3)) (WAI (2))) | (1 1 1) |
| s1 | s13 | ((RUN (2)) (RDY (1)) (WAI (3))) | (1 1 1) |
| s5 | s5 | ((RUN (3)) (RDY ()) (WAI (1 2))) | (1 0 2) |
| s5 | s8 | ((RUN (1)) (RDY ()) (WAI (2 3))) | (1 0 2) |
| s5 | s11 | ((RUN (2)) (RDY ()) (WAI (1 3))) | (1 0 2) |
| s12 | s12 | ((RUN ()) (RDY ()) (WAI (1 2 3))) | (0 0 3) |

FIG. 11

TABLE 5: TRANSITION TABLE

| TID | SID0 | SID1 | EVENT | [SID0] | [SID1] |
|---|---|---|---|---|---|
| t0 | s0 | s1 | ((sleep 1) ()) | s0 | s1 |
| t1 | s0 | s2 | ((yield 1) ()) | s0 | s0 |
| t2 | s2 | s3 | ((sleep 2) ()) | s0 | s1 |
| t3 | s2 | s4 | ((yield 2) ()) | s0 | s0 |
| t4 | s1 | s4 | ((wakeup 2 1) ()) | s1 | s0 |
| t5 | s1 | s5 | ((sleep 2) ()) | s1 | s5 |
| t6 | s1 | s6 | ((yield 2) ()) | s1 | s1 |
| t7 | s4 | s7 | ((sleep 3) ()) | s0 | s1 |
| t8 | s4 | s0 | ((yield 3) ()) | s0 | s0 |
| t9 | s3 | s0 | ((wakeup 3 2) ()) | s1 | s0 |
| t10 | s3 | s8 | ((sleep 3) ()) | s1 | s5 |
| t11 | s3 | s9 | ((yield 3) ()) | s1 | s1 |
| t12 | s6 | s10 | ((wakeup 3 1) ()) | s1 | s0 |
| t13 | s6 | s11 | ((sleep 3) ()) | s1 | s5 |
| t14 | s6 | s1 | ((yield 3) ()) | s1 | s1 |
| t15 | s5 | s1 | ((wakeup 3 2) ()) | s5 | s1 |
| t16 | s5 | s9 | ((wakeup 3 1) ()) | s5 | s1 |
| t17 | s5 | s12 | ((sleep 3) ()) | s5 | s12 |
| t18 | s5 | s5 | ((yield 3) ()) | s5 | s5 |
| t19 | s7 | s2 | ((wakeup 1 3) ()) | s1 | s0 |
| t20 | s7 | s11 | ((sleep 1) ()) | s1 | s5 |
| t21 | s7 | s13 | ((yield 1) ()) | s1 | s1 |
| t22 | s9 | s14 | ((wakeup 1 2) ()) | s1 | s0 |
| t23 | s9 | s5 | ((sleep 1) ()) | s1 | s5 |
| t24 | s9 | s3 | ((yield 1) ()) | s1 | s1 |
| t25 | s8 | s3 | ((wakeup 1 3) ()) | s5 | s1 |
| t26 | s8 | s13 | ((wakeup 1 2) ()) | s5 | s1 |
| t27 | s8 | s12 | ((sleep 1) ()) | s5 | s12 |
| t28 | s8 | s8 | ((yield 1) ()) | s5 | s5 |
| t29 | s11 | s6 | ((wakeup 2 3) ()) | s5 | s1 |
| t30 | s11 | s7 | ((wakeup 2 1) ()) | s5 | s1 |
| t31 | s11 | s12 | ((sleep 2) ()) | s5 | s12 |
| t32 | s11 | s11 | ((yield 2) ()) | s5 | s5 |
| t33 | s10 | s9 | ((sleep 2) ()) | s0 | s1 |
| t34 | s10 | s15 | ((yield 2) ()) | s0 | s0 |
| t35 | s13 | s15 | ((wakeup 2 3) ()) | s1 | s0 |
| t36 | s13 | s8 | ((sleep 2) ()) | s1 | s5 |
| t37 | s13 | s7 | ((yield 2) ()) | s1 | s1 |
| t38 | s14 | s13 | ((sleep 3) ()) | s0 | s1 |
| t39 | s14 | s10 | ((yield 3) ()) | s0 | s0 |
| t40 | s15 | s6 | ((sleep 1) ()) | s0 | s1 |
| t41 | s15 | s14 | ((yield 1) ()) | s0 | s0 |

FIG. 12

TABLE 6: TRANSITION TABLE (RESIDUAL)

| [TID] | TID | SID0 | SID1 | EVENT | [SID0] | [SID1] |
|---|---|---|---|---|---|---|
| t1 | t1 | s0 | s2 | ((yield 1) ()) | s0 | s0 |
| t1 | t3 | s2 | s4 | ((yield 2) ()) | s0 | s0 |
| t1 | t8 | s4 | s0 | ((yield 3) ()) | s0 | s0 |
| t1 | t34 | s10 | s15 | ((yield 2) ()) | s0 | s0 |
| t1 | t39 | s14 | s10 | ((yield 3) ()) | s0 | s0 |
| t1 | t41 | s15 | s14 | ((yield 1) ()) | s0 | s0 |
| t0 | t0 | s0 | s1 | ((sleep 1) ()) | s0 | s1 |
| t0 | t2 | s2 | s3 | ((sleep 2) ()) | s0 | s1 |
| t0 | t7 | s4 | s7 | ((sleep 3) ()) | s0 | s1 |
| t0 | t33 | s10 | s9 | ((sleep 2) ()) | s0 | s1 |
| t0 | t38 | s14 | s13 | ((sleep 3) ()) | s0 | s1 |
| t0 | t40 | s15 | s6 | ((sleep 1) ()) | s0 | s1 |
| t4 | t4 | s1 | s4 | ((wakeup 2 1) ()) | s1 | s0 |
| t4 | t9 | s3 | s0 | ((wakeup 3 2) ()) | s1 | s0 |
| t4 | t12 | s6 | s10 | ((wakeup 3 1) ()) | s1 | s0 |
| t4 | t19 | s7 | s2 | ((wakeup 1 3) ()) | s1 | s0 |
| t4 | t22 | s9 | s14 | ((wakeup 1 2) ()) | s1 | s0 |
| t4 | t35 | s13 | s15 | ((wakeup 2 3) ()) | s1 | s0 |
| t6 | t6 | s1 | s6 | ((yield 2) ()) | s1 | s1 |
| t6 | t11 | s3 | s9 | ((yield 3) ()) | s1 | s1 |
| t6 | t14 | s6 | s1 | ((yield 3) ()) | s1 | s1 |
| t6 | t21 | s7 | s13 | ((yield 1) ()) | s1 | s1 |
| t6 | t24 | s9 | s3 | ((yield 1) ()) | s1 | s1 |
| t6 | t37 | s13 | s7 | ((yield 2) ()) | s1 | s1 |
| t5 | t5 | s1 | s5 | ((sleep 2) ()) | s1 | s5 |
| t5 | t10 | s3 | s8 | ((sleep 3) ()) | s1 | s5 |
| t5 | t13 | s6 | s11 | ((sleep 3) ()) | s1 | s5 |
| t5 | t20 | s7 | s11 | ((sleep 1) ()) | s1 | s5 |
| t5 | t23 | s9 | s5 | ((sleep 1) ()) | s1 | s5 |
| t5 | t26 | s13 | s8 | ((sleep 2) ()) | s1 | s5 |
| t15 | t15 | s5 | s1 | ((wakeup 3 2) ()) | s5 | s1 |
| t15 | t16 | s5 | s9 | ((wakeup 3 1) ()) | s5 | s1 |
| t15 | t25 | s8 | s3 | ((wakeup 1 3) ()) | s5 | s1 |
| t15 | t26 | s8 | s13 | ((wakeup 1 2) ()) | s5 | s1 |
| t15 | t29 | s11 | s6 | ((wakeup 2 3) ()) | s5 | s1 |
| t15 | t30 | s11 | s7 | ((wakeup 2 1) ()) | s5 | s1 |
| t17 | t17 | s5 | s12 | ((sleep 3) ()) | s5 | s12 |
| t17 | t27 | s8 | s12 | ((sleep 1) ()) | s5 | s12 |
| t17 | t31 | s11 | s12 | ((sleep 2) ()) | s5 | s12 |
| t18 | t18 | s5 | s5 | ((yield 3) ()) | s5 | s5 |
| t18 | t28 | s8 | s8 | ((yield 1) ()) | s5 | s5 |
| t18 | t32 | s11 | s11 | ((yield 2) ()) | s5 | s5 |

FIG. 13

TABLE 7: TRANSITION PATH (RESIDUAL)

| [TID] | SID0 | SID1 | EVENT |
|---|---|---|---|
| t0 | s0 | s1 | ((sleep 1) ()) |
| t5 | s1 | s5 | ((sleep 2) ()) |
| t18 | s5 | s5 | ((yield 3) ()) |
| t17 | s5 | s12 | ((sleep 3) ()) |
| break | | | |
| t0 | s0 | s1 | ((sleep 1) ()) |
| t6 | s1 | s6 | ((yield 2) ()) |
| t5 | s1 | s5 | ((sleep 2) ()) |
| t15 | s5 | s1 | ((wakeup 3 2) ()) |
| t4 | s1 | s4 | ((wakeup 2 1) ()) |
| t1 | s0 | s2 | ((yield 1) ()) |
| break | | | |

FIG. 14

TABLE 8: TRANSITION PATH

| [TID] | SID0 | SID1 | EVENT |
|---|---|---|---|
| t0 | s0 | s1 | ((sleep 1) ()) |
| t5 | s1 | s5 | ((sleep 2) ()) |
| t18 | s5 | s5 | ((yield 3) ()) |
| t17 | s5 | s12 | ((sleep 3) ()) |
| break | | | |
| t0 | s0 | s1 | ((sleep 1) ()) |
| t6 | s1 | s6 | ((yield 2) ()) |
| t13 | s6 | s11 | ((sleep 3) ()) |
| t29 | s11 | s6 | ((wakeup 2 3) ()) |
| t12 | s6 | s10 | ((wakeup 3 1) ()) |
| t34 | s10 | s15 | ((yield 2) ()) |
| break | | | |

FIG. 15

TEST CASE GENERATION APPARATUS, GENERATION METHOD THEREFOR, AND PROGRAM STORAGE MEDIUM

CROSS REFERENCE TO RELATED APPLICATIONS

This application is based upon and claims the benefit of priority from the prior Japanese Patent Applications No. 2008-117173, filed on Apr. 28, 2008; the entire contents of which are incorporated herein by reference.

BACKGROUND OF THE INVENTION

1. Field of the Invention

The present invention relates to a test case generation apparatus, a generation method therefor, and a program storage medium storing a program for generating a test case, and to a program verification technique, for example.

2. Related Art

Designing of a test case using a state transition diagram is known as an effective method for creating a systematic test case. When the calculation process of a computer system is abstracted into a state transition diagram, a comprehensive test case is represented by a path that covers all states or all transitions. Because a state transition diagram can be regarded as a directed graph, various approximation solutions are known for the problem of test case generation by reducing to a problem of generating the shortest path that covers the nodes or arcs of a directed graph (e.g., traveling salesman problem, Chinese postman problem, or the like).

As actual computer systems have complex internal states, when the abstraction level of a state transition diagram is low, the state transition diagram would have an extremely large number of states and a corresponding test case would be also very large. On the other hand, when the abstraction level of a state transition diagram is high, it would have less states and a corresponding test case would be also small, but it is necessary to create a state transition diagram with abstraction applied according to the purpose of a test.

SUMMARY OF THE INVENTION

According to an aspect of the present invention, there is provided with a test case generation apparatus including a computer readable storage medium containing a set of instructions that cause a computer processor to perform a data analyzing process which generates a test case for a target system, comprising:

a first input unit configured to input a state transition diagram of the target system, the state transition diagram representing first transitions between a plurality of states in the target system;

a second input unit configured to input a mapping function that maps a given state to a value within a certain range;

a grouping unit configured to map each of the states included in the state transition diagram with the mapping function to obtain a plurality of mapping values, and groups the states in the state transition diagram based on the mapping values by classifying the states having same mapping value into same group to generate a plurality of groups each including one or more states;

a contracted state transition diagram generator configured to specify any two groups among the groups, set a second transition from one group of the two groups to the other group when there is at least one first transition from one of states included in the one group to one of states included in the other group, and by iterating these specifying and setting, generate a contracted state transition diagram that represents second transitions between the groups;

a representative transition path generator configured to generate a representative transition path which is a sequence of the second transitions by tracing each second transition in the contracted state transition diagram starting from a predetermined group in a serial manner;

a transition path converting unit configured to
sequentially select each second transition in the representative transition path in a traced order,
for each selected second transition, find a first transition which has same transition source state as one of states included in a transition source group of the selected second transition, has same transition destination state as one of states included in a transition destination group of the selected second transition and has same transition source state as a transition destination state of an immediately found first transition, and
generate a transition path which is a sequence of each found first transition; and
an output unit configured to output the transition path as the test case.

According to an aspect of the present invention, there is provided with a test case generation method performed in a computer apparatus including a computer readable storage medium containing a set of instructions that cause a computer processor to perform a data analyzing process which generates a test case for a target system, comprising:

inputting a state transition diagram of the target system, the state transition diagram representing first transitions between a plurality of states in the target system;

inputting a mapping function that maps a given state to a value within a certain range;

mapping each of the states included in the state transition diagram with the mapping function to obtain a plurality of mapping values, and groups of the states in the state transition diagram based on the mapping values by classifying states having same mapping value into same group to generate into a plurality of groups each including one or more states;

specifying any two groups among the groups, setting a second transition from one group of the two groups to the other group when there is at least one first transition from one of states in the one group to one of states included in the other group, and by iterating these specifying and setting, generating a contracted state transition diagram that represents second transitions between the groups;

generating a representative transition path which is a sequence of the second transitions by tracing each second transition in the contracted state transition diagram starting from a predetermined group in a serial manner;

sequentially selecting each second transition in the representative transition path in a traced order;

for each selected second transition, finding a first transition which has same transition source state as one of states included in a transition source group of the selected second transition, has same transition destination state as one of states included in a transition destination group of the selected second transition, and has same transition source state as a transition destination state of an immediately found first transition;

generating a transition path which is a sequence of each found first transition; and outputting the transition path as the test case.

According to an aspect of the present invention, there is provided with a program storage medium storing a computer program for causing a computer which generates a test case for a target system, to execute instructions to perform the steps of:

inputting a state transition diagram of the target system, the state transition diagram representing first transitions between a plurality of states in the target system;

inputting a mapping function that maps a given state to a value within a certain range;

mapping each of the states included in the state transition diagram with the mapping function to obtain a plurality of mapping values, and groups of the states in the state transition diagram based on the mapping values by classifying states having same mapping value into same group to generate into a plurality of groups each including one or more states;

specifying any two groups among the groups, setting a second transition from one group of the two groups to the other group when there is at least one first transition from one of states in the one group to one of states included in the other group, and by iterating these specifying and setting, generating a contracted state transition diagram that represents second transitions between the groups;

generating a representative transition path which is a sequence of the second transitions by tracing each second transition in the contracted state transition diagram starting from a predetermined group in a serial manner;

sequentially selecting each second transition in the representative transition path in a traced order;

for each selected second transition, finding a first transition which has same transition source state as one of states included in a transition source group of the selected second transition, has same transition destination state as one of states included in a transition destination group of the selected second transition, and has same transition source state as a transition destination state of an immediately found first transition;

generating a transition path which is a sequence of each found first transition; and outputting the transition path as the test case.

BRIEF DESCRIPTION OF THE DRAWINGS

FIG. 8 shows a state table as Table 1 that corresponds to the state transition diagram of FIG. 3;

FIG. 9 shows a transition table as Table 2 that corresponds to the state transition diagram of FIG. 3;

FIG. 10 shows transition paths in the state transition diagram of FIG. 3 as Table 3;

FIG. 11 shows the result of equivalence partitioning on Table 1 of FIG. 3 as Table 4 (a state table corresponding to the contracted state transition diagram);

FIG. 12 shows a transition table corresponding to the contracted state transition diagram as Table 5;

FIG. 13 shows the result of equivalence partitioning on the transition table of FIG. 12 as Table 6;

FIG. 14 shows representative transition paths of the contracted state transition diagram as Table 7; and FIG. 15 shows transition paths in the state transition diagram of FIG. 3 that are reconstructed based on representative transition path as Table 8.

DETAILED DESCRIPTION OF THE INVENTION

An embodiment of the present invention will be described below with reference to drawings.

Figure 1:
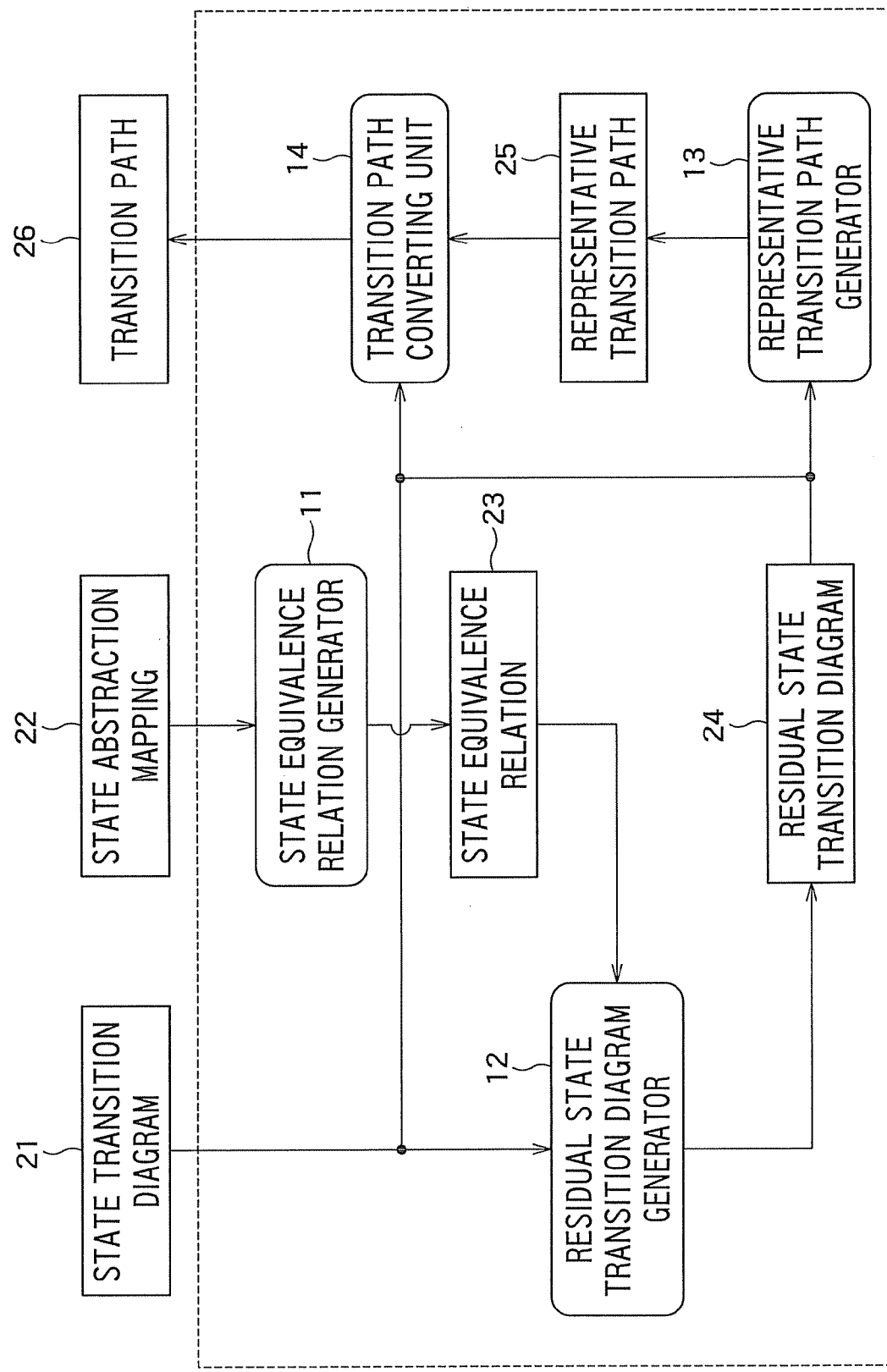
FIG. 1 is a block diagram showing the configuration of a test case generation apparatus as an embodiment of the present invention.

FIG. 1 is a block diagram showing the configuration of a test case generation apparatus as an embodiment of the present invention.

This test case generation apparatus has a first input unit which inputs the state transition diagram 21 that represents transitions (first transitions) between a plurality of states that a tested system (target system such as automatic dispenser etc.) can have and a second input unit which inputs state abstraction mapping (a mapping function) 22 that has a plurality of states as a domain and maps a given state to a value within a certain range, and generates a transition path 26 which is a test case for the target system based on the state transition diagram 21 and the mapping function 22. The test case generation apparatus has an output unit which output the transition path 26. As an example of practical application of the present invention, by using the test case, it is possible to verify whether the target system satisfies the state transition diagram or an operation specification on which the state transition diagram is based. Specifically, by generating actually transition (events) of the test case in the target system and confirming occurrence of same operations as those of the state transition diagram (or the operation specification), a user can confirm that the target system satisfies the state transition diagram (or the operation specification).

While the present embodiment is discussed with an example of the state transition diagram of a task control monitor as the state transition diagram 21, the embodiment is also effective on other examples. The task control monitor will be described here.

(Task Control Monitor)

Figure 2:
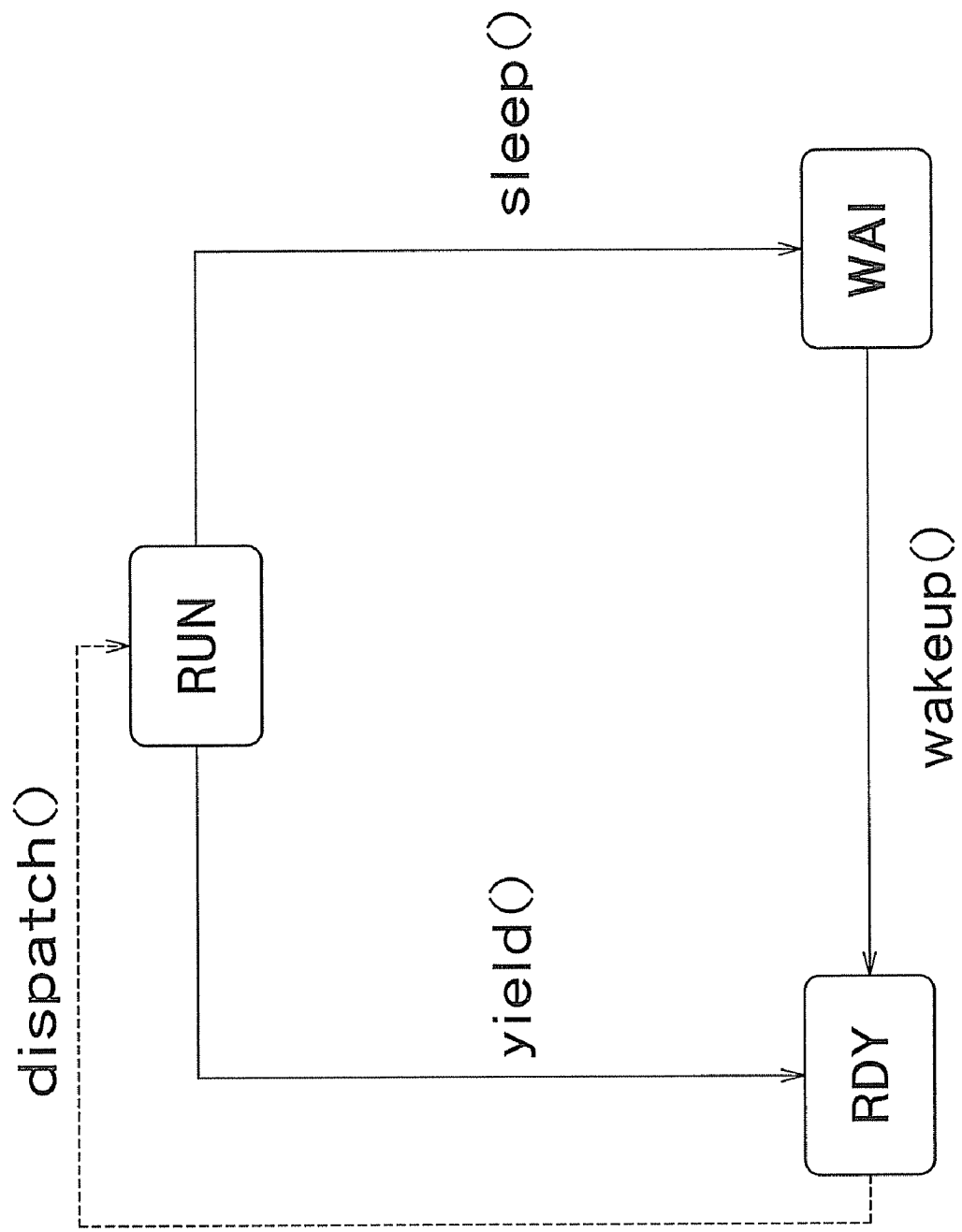
FIG. 2 illustrates a task control monitor.

Consider a monitor function for controlling the execution state of tasks in an information system in which a plurality of tasks exist. As shown in FIG. 2, each task in the monitor has three states: running (RUN), ready (RDY), and sleep (WAI) states.

The monitor provides each task with three Application Programming Interface (API) functions, including spontaneous CPU handover operation (yield), spontaneous transition operation to the sleep state (sleep), and change of a task in the sleep state to the ready state (wakeup). These functions are called by a task which is in running (RUN) state.

Figure 3:
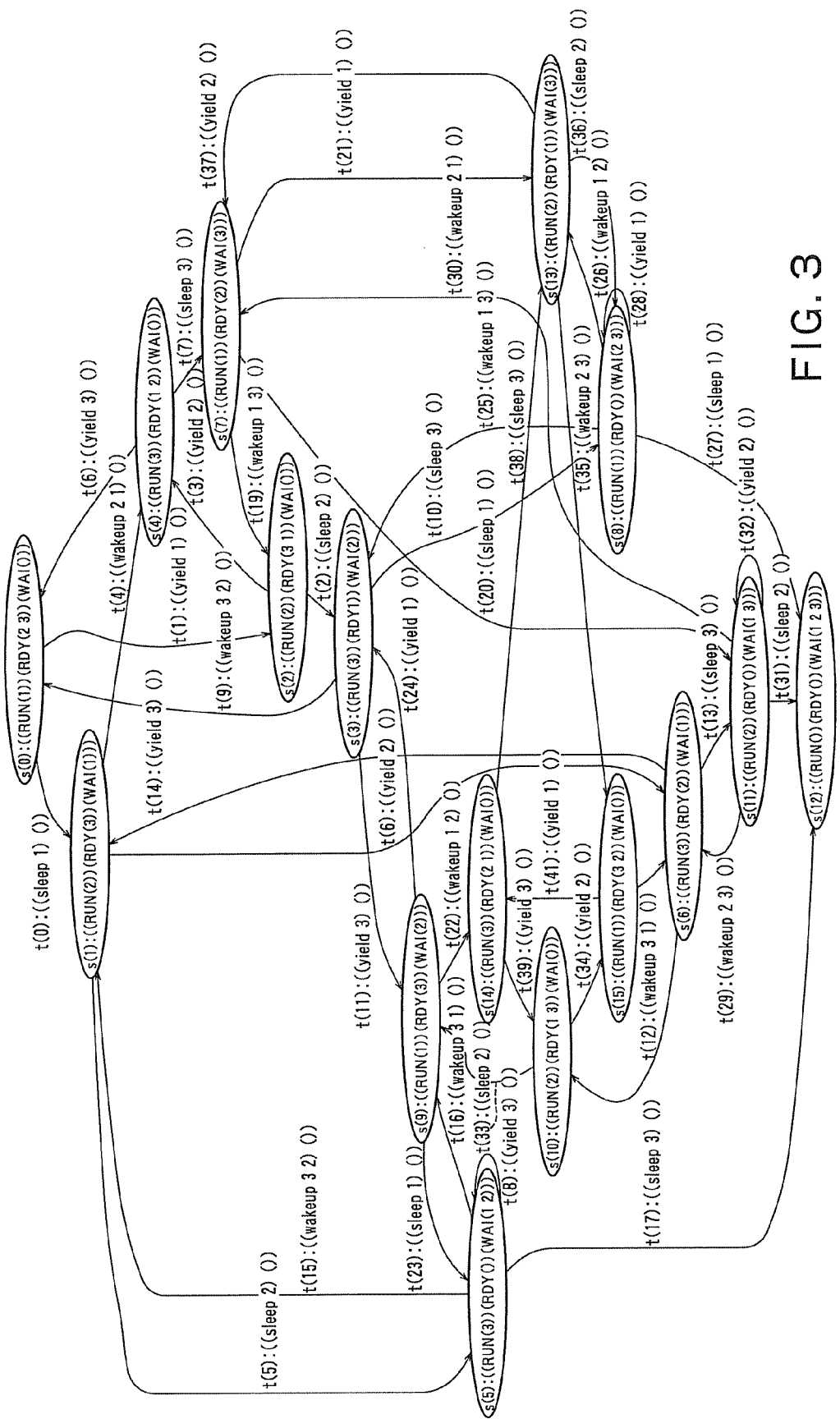
FIG. 3 shows a state transition diagram.

A state transition diagram representing states that the task control monitor can have and transitions between those states when there are three tasks is shown in FIG. 3. The state transition diagram of FIG. 3 is a directed graph that is described with the states in Table 1 shown in FIG. 8 and the transitions of Table 2 shown in FIG. 9, and its initial state is state "s0".

More specifically, Table 1 shows identifiers (SID or StateID) and respective states, and Table 2 shows identifiers of transitions (TID or TransitionID), identifiers of source states (SID0), identifiers of destination states (SID1), and contents of transitions (events). However, the mapping result of Table 1 is added during processing by a state equivalence relation generator (a grouping unit) 11 discussed below and does not exists yet when Table 1 is input to the present apparatus.

(Instance of Test Case)

To check the operation of a task control monitor described by this state transition diagram (FIG. 3, and Tables 1 and 2), API functions corresponding to individual task transitions may be called in sequence starting from the initial state of the diagram and occurrence of a task change corresponding to a state as the destination of transition may be checked. For example, operation may be checked such that: when tasks 1 calls (sleep1) in the initial state s0, task 2 becomes running, and when task 2 in turn calls (sleep2), task 3 becomes running, and when task 3 in turn calls (yield3), tasks 3 becomes ready . . . and so on. This checking procedure corresponds to a transition path t0→t5→t18 that starts from the state "s0" and reaches state "s5" in the state transition diagram.

To carry out checking of system operation comprehensively and by the shortest procedure, considering the state transition diagram to be a directed graph, the shortest transition path that covers the transitions in the directed graph may be calculated and the system may be operated with events that correspond to transitions in the shortest transition sequence.

The problem of generating the shortest transition sequence that covers the transitions in a directed graph is known as Chinese Postman Problem or CPP in the field of graph algorithm, and there is an approximation algorithm for determining a transition sequence that guarantees comprehensiveness (see Document 1: Harold W. Thimbleby: "The directed Chinese Postman Problem", In Software-Practice and Experience (SPE), Volume 33, pp. 1081-1096, 2003). The approximation of the algorithm in this case means generation of a transition sequence that is close to the shortest transition sequence.

A result of determining a transition sequence that covers the transitions in the state transition diagram (FIG. 3, 16 states and 42 transitions) with the approximation algorithm (see Document 1) is shown in Table 3 of FIG. 10. The 42 states can be covered with 50 consecutive transitions if the system is driven along the four transition sequences that start from the initial state. Such transition sequences are called test cases for the system. It is assumed that a transition sequence always starts from the initial state "s0". The reason why the number of transition sequences is not one is that state "s12" is a state that has no destination state and subsequent transition could not continue once state "s12" is entered.

(Reduction of Test Cases)

A test that covers all transitions in a system is not practical because the size of a test case generally exponentially increases as the size of the system grows. To make a test practicable, it is required to give a certain test criterion to reduce the size of the test case. For instance, the 16 states of the task control monitor of the example include states that would match if task identifier numbers are rearranged. For example, as possible distinctions, states "s0" and "s2" would match if the order of task identifiers is changed, whereas states "s0" and "s12 would not match even if the order of task identifiers is changed. An example of the certain test criterion may be "to consider states that will match with rearrangement of task identifier numbers as equivalent states and perform operation check only on transitions between non-equivalent states".

This embodiment automatically generates an efficient test case (a transition path) 26 that satisfies a designated test criterion by inputting such a certain test criterion represented in the form of the state abstraction mapping 22, which is discussed below.

(A State Transition Diagram and a Contracted State Transition Diagram)

Now, a state transition diagram and a contracted state transition diagram are described.

A state transition diagram F is defined by combination of a finite set of states S, a finite set of transitions T ($\subset$ S×S), and the initial state "s0". A contracted state transition diagram F/~ can be defined by giving the state transition diagram F and an equivalence relation "~" relating to the states of "F". The states of the contracted state transition diagram F/~ are equivalence classes (or groups) obtained by performing equivalence-partitioning (grouping) for the states of the state transition diagram F based on an equivalence relation "~". As the transitions in the contracted state transition diagram F/~, transition relations between equivalence classes are defined on the assumption that when a transition exists between state "s" and state "s'" of "F", a transition exists between equivalence classes containing those states "s" and "s'".

State transition diagram: F=<S, T, s0>

State set: S

Transition set: T$\subset$S×S

Initial state: s0$\in$S

Contracted state transition diagram: F/~=<S/~,T/~,[s0]>

Contracted state: S/~={[s]|s$\in$S}

Contracted transition: T/~={([s],[s'])|(s, s')$\in$T}

The relation "~" means the equivalence relation "equiv" described above, and the following equivalence class [s] is assumed to be a set that has state "s" as the representative element and is a collection of equivalent states in terms of an equivalence relation "~".

Equivalence class: [s]={3'$\in$S|equiv(s, s')=true}

Functions that make reference to the preceding and subsequent states of a transition "t" for each transition t=(s, s')$\in$T in the state transition diagram are represented as "src(t)=s" and "dst(t)=s'", which will be used hereinafter.

source state: dst: T→S destination state: src: T→S (Definition of a State Equivalence Relation)

To calculate a contracted transition diagram from a state transition diagram, it is necessary to define an equivalence relation between states An equivalence relation between states, "equiv(s, s')", is required to meet a reflexivity rule, a symmetry rule, and a transitivity rule as definition of an equivalence relation. "B" represents a set of Bloom values that represent either true or false (true/false values). When "s" and "s'" are an equivalence, "equiv(s, s')" returns true.

Equivalence relation "equiv": S×S→B reflexivity rule: $\forall$s$\in$S. equiv(s, s)

symmetry rule: $\forall$s$\in$S. $\forall$s'$\in$S. equiv(s, s')$\Rightarrow$equiv(s', s)

transitivity rule: $\forall$s$\in$S.$\forall$s'$\in$S. equiv(s, s')$\wedge$equiv(s', s")$\Rightarrow$equiv(s, s")

(Structuring of a State Equivalence Relation)

In general, a function that returns a true/false value from two states does not always meet the equivalence relation axioms shown above. When generating a contracted transition diagram, it is not desirable to let a user to describe an equivalence relation as a predicate function for two states because the user may describe a predicate function that does not form an equivalence relation.

The user accordingly describes mapping "map" that abstracts states and inputs the mapping to the present apparatus as the state abstraction mapping 22. The state equivalence relation generator (grouping unit) 11 of the present apparatus generates definition of a state equivalence relation 23 (Table 4 of FIG. 11 described below) utilized for generating the contracted transition diagram 24, from the state abstraction mapping 22 and the state transition diagram 21.

The function "equal?" represents an equal sign relation in a range "V" of the mapping "map".

State mapping "map": S→V

Equivalence relation "equiv(s,s')"=equal?(map(s),map(s'))

Figure 5:
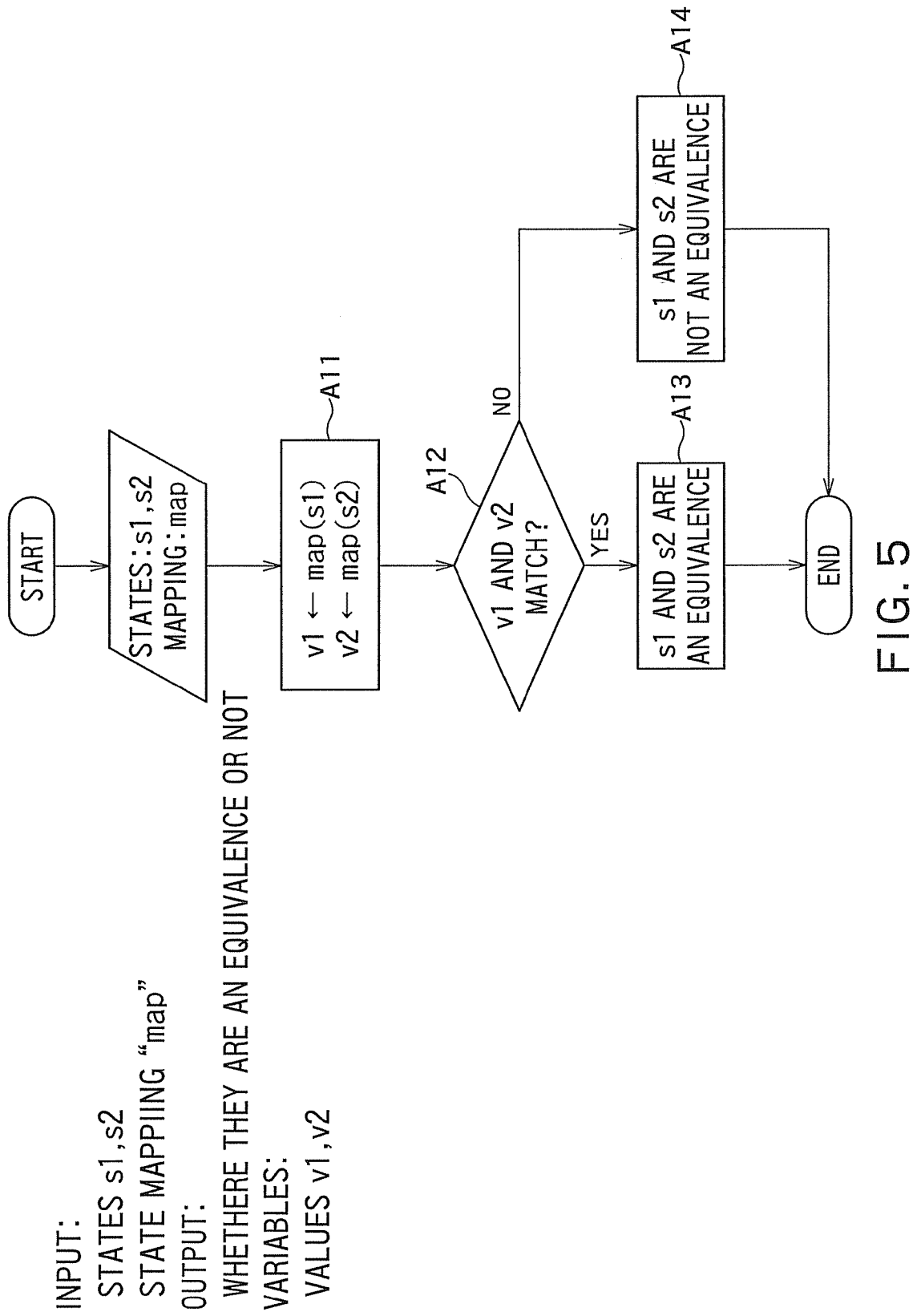
FIG. 5 is a flowchart illustrating a procedure of defining a state equivalence relation.

FIG. 5 is a flowchart illustrating the procedure of defining the equivalence relation between states (i.e. the procedure of grouping). Processing according to this procedure is performed by the state equivalence relation generator (grouping unit) 11. Two states "s1" and "s2" are taken from the state transition diagram 21 and supplied to the state abstraction mapping (mapping function) 22 for calculation of their respective mapping values (A11). If the mapping values match (YES at S12), "s1" and "s2" are determined to be an equivalence (i.e. to be belonged to same group) (A13), and if not (NO at S12), "s1" and "s2" are determined not to be an equivalence (A14). In this way, the state equivalence relation generator (a grouping unit) map each of the states included in the state transition diagram with the mapping function to obtain a plurality of mapping values, and perform grouping of the states into a plurality of groups based on the mapping values by classifying states having same mapping value into one group.

EXAMPLE

Task Control Monitor

We provide below an instance of the state mapping 22 that considers states that will match each other with rearrangement of task identifiers as the identical states. This mapping example is described in the format of a well-known programming language, Scheme (see Document 2: Harold Abelson and Gerald Jay Sussman with Julie Sussman: "Structure and Interpretation of Computer Programs", MIT Press, 1996).

MAPPING EXAMPLE (define (len s)
(map (lambda (v) (length(getval s v)))'(RUN RDY WAI)))

OPERATION EXAMPLES when s=((RUN(1))(RDY(2 3))(WAI( )), (len s)→(1 2 0)
when s=((RUN( ))(RDY( ))(WAI(1 2 3))), (len s)→(0 0 3)

The above examples use a function that returns the length of lists of variables (RUN, RDY, and WAI) which manage the states of tasks assuming that the contents (states) shown in Table 1 of FIG. 8 are stored in a variable "s" in the list format of the programming language, Scheme (see Document 2). The function "getval" is a function for obtaining a corresponding value from the name of a variable. The result of applying this function to states is shown in the rightmost column of Table 1 of FIG. 8 (mapping results or mapping values). By considering that states whose mapping values match each other are in an equivalence relation, the classification into equivalence classes (or groups) is performed and the result of the classification is shown in Table 4 of FIG. 11,. Assuming that a state representative of an equivalence class is one that has the smallest state identifier, the representative states [SID] of the equivalence classes are four states: s0, s1, s5, and s12.

The states of a contracted state transition diagram are the equivalence classes of states (hereinafter state classes), the transitions in the contracted state transition diagram are transitions between the state classes, and it is assumed that a transition relation exists between two state classes when there is a transition relation between states that are contained in those state classes.

Figure 6:
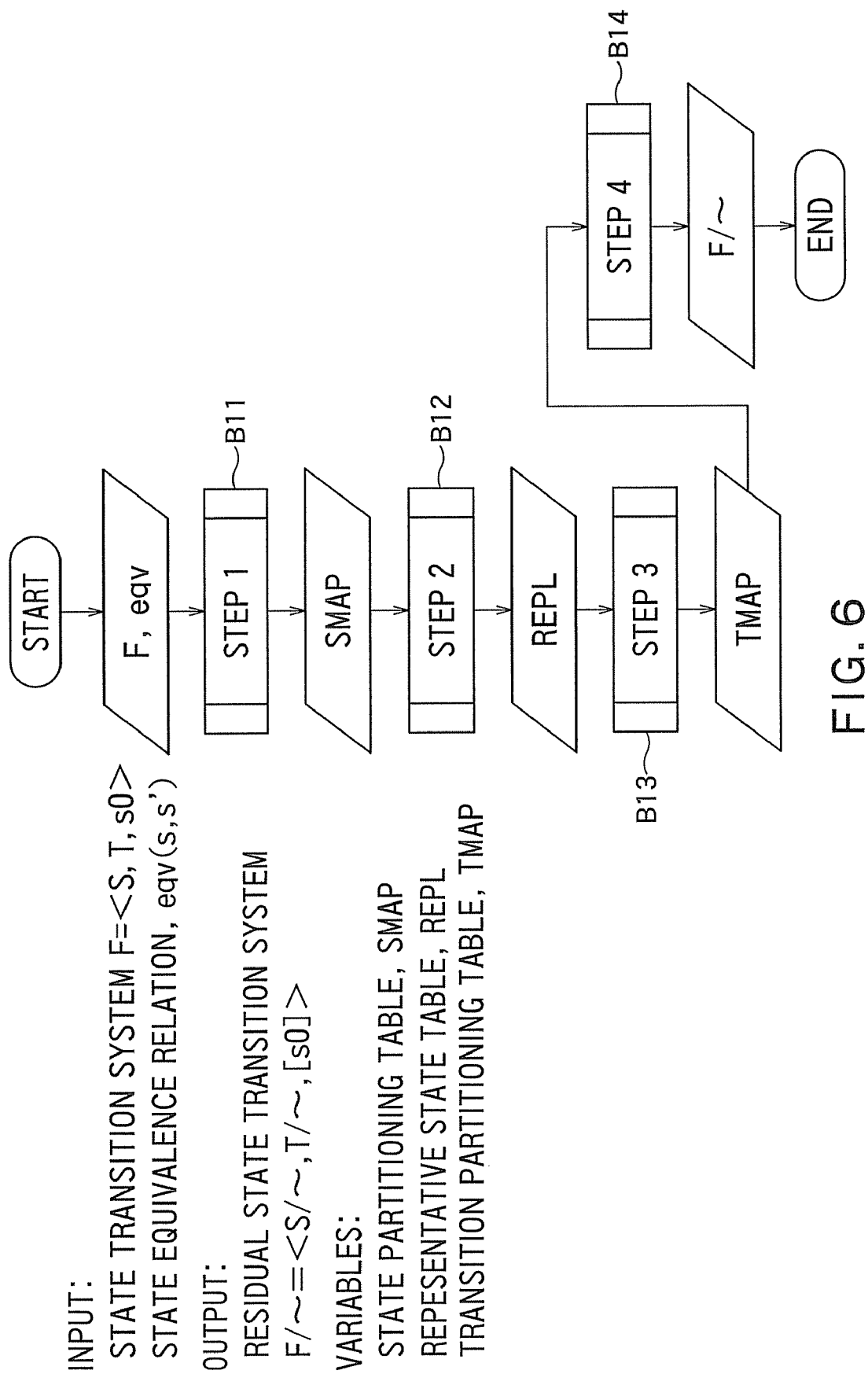
FIG. 6 is a flowchart illustrating a procedure of generating a contracted state transition diagram.

An algorithm for generating such a contracted state transition diagram is described below. A flow of processing corresponding to the algorithm is shown in the flowchart of FIG. 6. This algorithm is executed by the contracted state transition diagram generator 12 (the contracted state transition diagram generator 12 may be called a state transition diagram generator simply). The contracted state transition diagram generator (the state transition diagram generator) 12 generates the contracted state transition diagram 24 by using the state equivalence relation 23 (Table 4 of FIG. 11) and the state transition diagram 21 according to the algorithm shown below.

(Algorithm for Generating a Contracted State Transition Diagram)

In the description of the algorithm, a symbol "φ" means an empty set and "←" means substitution of the right side into the left side. "KEYS" refers to the procedure for obtaining the range of mapping. "P(X)" means the power set of X, which is the set of all subsets of X.

Input: state transition diagram "F", equivalence relation "equiv"

Output: contracted state transition diagram F/~Variables:
SMAP: S→P(S)
TMAP: S×S→P(T)
REPL: S→S Step 1: equivalence partitioning of states (reference numeral B11 in the FIG. 6 flowchart)
Precondition: SMAP is empty
Postcondition: the result of state equivalence partitioning in SMAP
SMAP←φ
for each s ∈S do
if ∃ s'∈KEYS(SMAP).equiv(s, s') then
SMAP(s')←SMAP(s')∪{s}
else
SMAP(s)←{s}
end if
end do Step 2: decide a representative state (reference numeral B12 in the FIG. 6 flowchart)
Precondition: the result of state equivalence partitioning in SMAP
Postcondition: a lookup table of representative states in REPL
REPL←φ
for each s ∈KEYS(SMAP) do
for each s' ∈SMAP(s) do
REPL(s')←s
end do
end do Step 3: equivalence partitioning of transitions (reference numeral B13 in the FIG. 6 flowchart)
Precondition: TMAP is empty and the lookup table of representative states in REPL
Postcondition: the result of transition equivalence partitioning in TMAP
for each t ∈ T do
key←(REPL(src(t)),REPL(dst(t)))
if ∃ t'∈KEYS(TMAP). key=t'do
TMAP(t')←TMAP(t') ∪{t}
else
TMAP(key)←{t}
end if
end do Step 4: output of the result (reference numeral B14 in the FIG. 6 flowchart)

Determine S/~ from the state partitioning SMAP and T/~ from the transition partitioning TMAP, and output the contracted transition diagram F/~=<S/~, T/~, [s0]>and stop

EXAMPLE

Task Control Monitor

When the state equivalence relation generator 11 completes classification of states into equivalence classes, a representative state [SID] (i.e. group) has been determined for each state SID (the leftmost column of Table 4 of FIG. 11). State classes that serve as states of the contracted transition diagram are labeled with the identifiers of representative states (i.e. group identifiers).

Transitions in the contracted transition diagram are determined by identifying representative states ([SID0] and [SID1]) to which the source and destination states (i.e., SID0 and SID1) of each transition belong as shown in the transition table (Table 5 of FIG. 12) and classifying transitions having the same combination of representative states in same equivalence class (i.e same group) (Table 6 of FIG. 13). A transition having the smallest identifier TID in a transition class is used for identification of the transition class as the representative transition [TID]. In this example, there are eight transition classes (i.e eight groups): t0, t1, t4, t5, t6, t15, t17, and t18.

Figure 4:
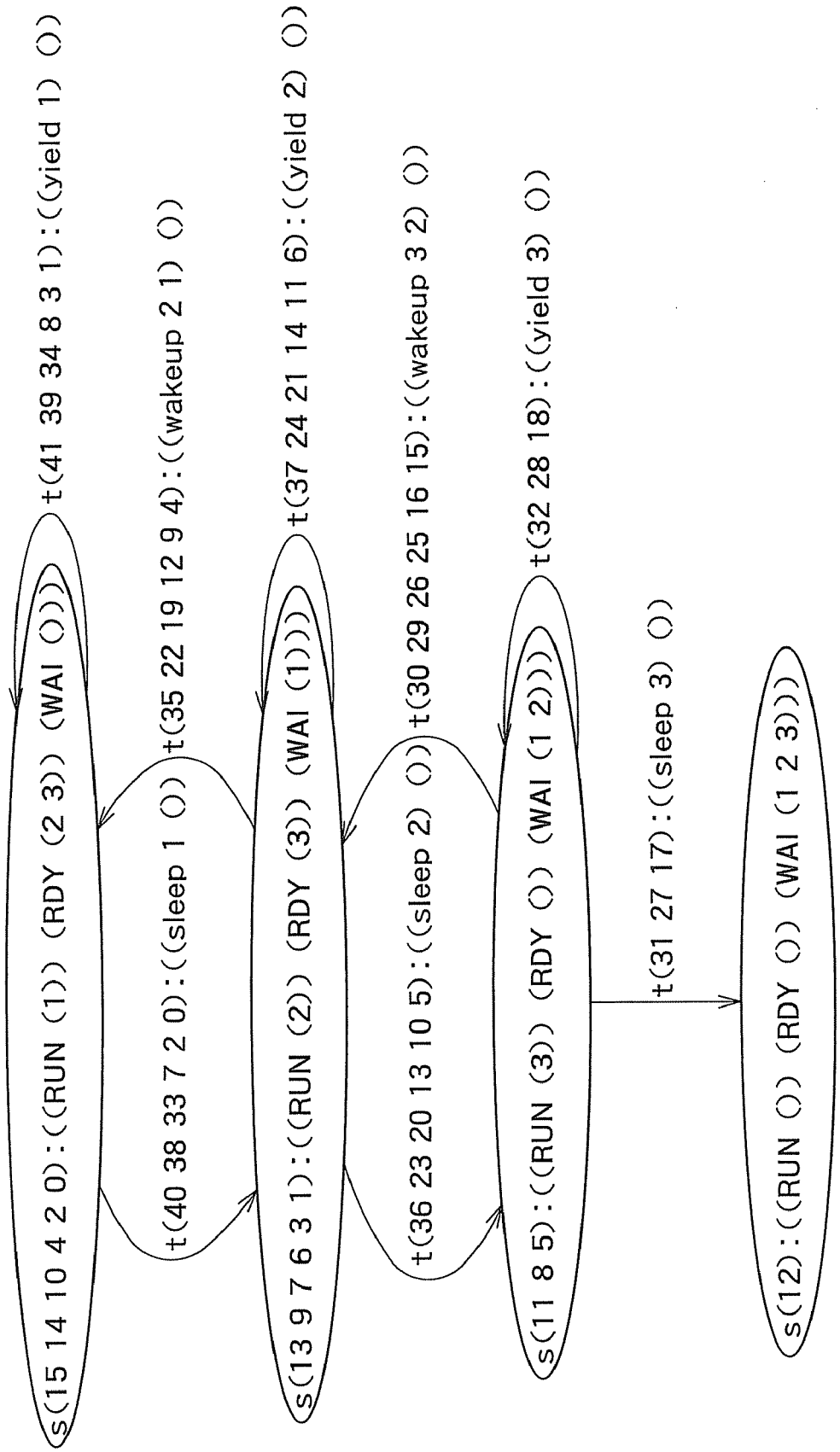
FIG. 4 shows a contracted state transition diagram.

FIG. 4 shows a finally obtained contracted state transition diagram (four states and eight transitions). This corresponds to Table 6 of FIG. 13. The states and transitions of this state transition diagram include states and transitions of the original state transition diagram 21. In FIG. 4, it is advised that the contents of representative states and/or representative transition events are shown.

"SMAP" upon completion of step 1 (B11) of FIG. 6 is:
SMAP(s0)={s0, s2, s4, s10, s14, s15}
SMAP(s1)={s1, s3, s6, s7, s9, s13}
SMAP(s5)={s5, s8, s11}
SMAP(s12)={s12}
"REPL" upon completion of step 2 (B12) of FIG. 6 is:
REPL(s0)=s0
REPL(s1)=s1
REPL(s2)=s0
... omitted
REPL(s14)=s0
REPL(s15)=s0
"TMAP" upon completion of step 3 (B13) of FIG. 6 is:
TMAP((s0, s0))={t1, t3, t8, t34, t39, t41}
TMAP((s0, s1))={t0, t2, t7, t33, t38, t40}
... omitted
TMAP((s5, s5))={t18, t28, t32}

In the above stated algorithm, illustration of "KEYS" in the above "SMAP" example is: KEYS(SMAP)={s0, s1, s5, s12}.

In this way, the state transition diagram generator 12 specifies two groups among the groups (i.e. combines two representative states) sequentially. For the specified two groups (i.e. two representative states (or two classes)), the state transition diagram generator 12 sets a second transition from one group of the two groups to the other group when there is at least one first transition from one of states included in the one group to one of states included in the other group. The state transition diagram generator 12 iterates this specifying of two groups and setting a second transition. Thereby, the state transition diagram generator generates the contracted state transition diagram that represents second transitions between the groups (i.e representative states or classes);

(Method of Transition Path Conversion)

Figure 7:
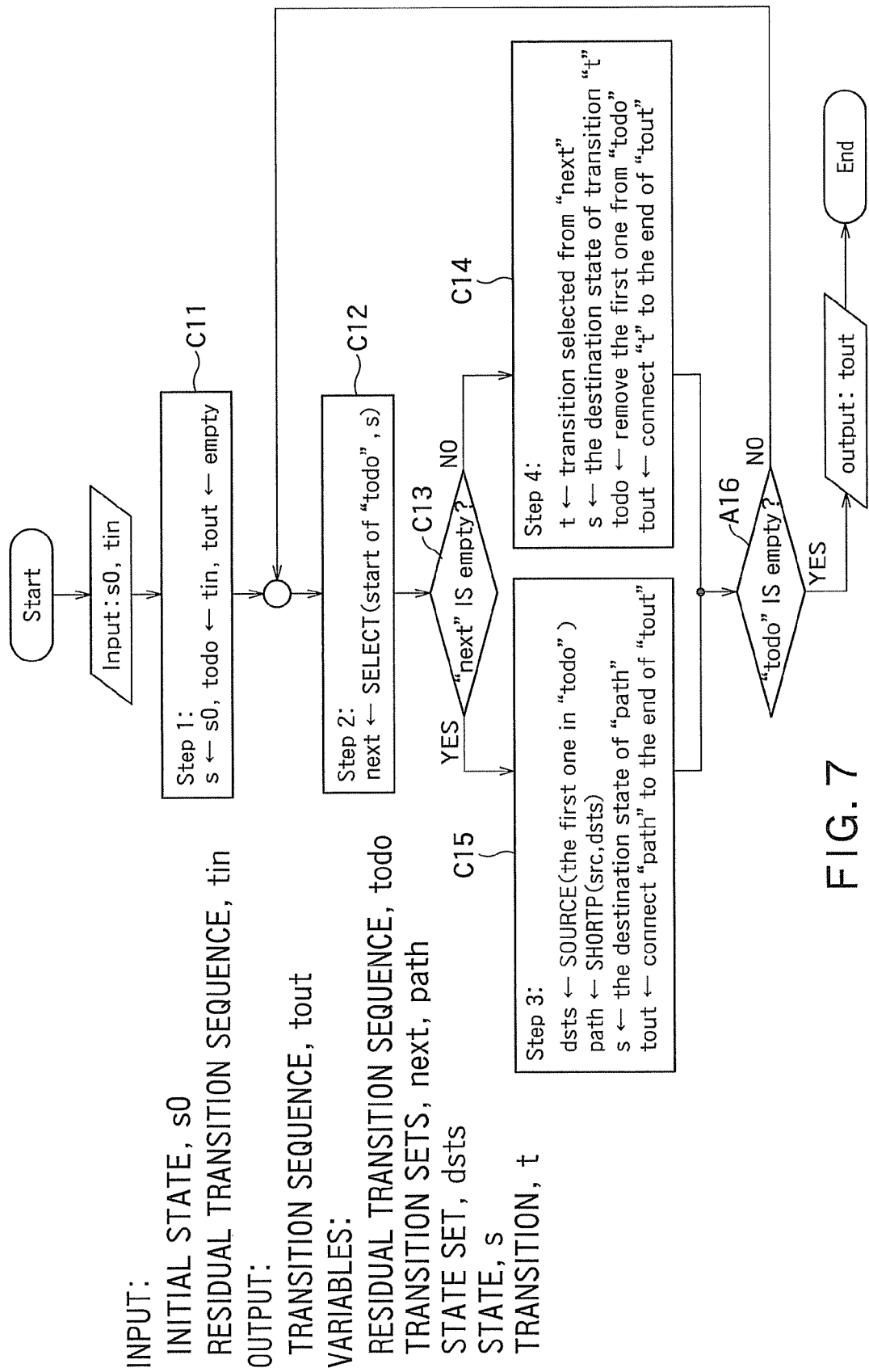
FIG. 7 is a flowchart illustrating a procedure of transition path conversion.

The representative transition path generator 13 generates a representative transition path 25 represented by representative states (i.e. groups or classes) and representative transition events, the path 25 covering the transitions (i.e. second transitions) in the contracted state transition diagram 24 (FIG. 4). That is, the representative transition path generator generates a representative transition path which is a sequence of the second transitions by tracing sequentially the second transitions in the contracted state transition diagram starting from a predetermined representative state (i.e. a predetermined group) in the contracted state transition diagram. The predetermined representative state (i.e. the predetermined group) is a representative state (i.e. group) including an initial state s0. This can employ a known algorithm (see Document 1), for example. Here, a transition path that can be executed as a test is a continuous transition path that starts from the initial state s0. A continuous transition path means the destination state of the current transition is the same as the source state of the next transition within a transition sequence. The representative transition path 25 which is continuous in the contracted state transition diagram is not always a continuous transition path in the state transition diagram. Thus, if the shortest representative transition path 25 that covers the contracted state transition diagram 24 is not a continuous path in the original state transition diagram, conversion to a continuous transition path based on the representative transition path 25 is required. A procedure of such path conversion is shown below. A flow of processing corresponding to the procedure is shown in the flowchart of FIG. 7. This processing is performed by the transition path converting unit 14. This processing may be performed only when the transition path converting unit 14 determines that the representative transition path 25 is not a continuous path in the original state transition diagram, or always performed without determination of whether the representative transition path 25 is a continuous path in the original state transition diagram or not.

Selection of transitions, SELECT: T/~×S→P(T)
Function: to select transitions that start from state "s" in transition class [t]
Details: SELECT([t], s)={t'∈[t]|src(t')=s}
Selection of states, SOURCE: T/~→P(S)
Function: to enumerate start points of transitions contained in transition class [t]
Details: SOURCE([t])={src(t') ∈S|t'∈ [t]}
Path generation, SHORTP: S×P(S)→[T]
Function: to select the shortest path among paths that reach state set "dsts" from state "s"
Details: SHORTP(s, dsts)=DIJKSTRA(s, s')
where "DIJKSTRA" is a known procedure of shortest path calculation (e.g., Dijkstra's algorithm) and the state "s'∈dsts" has the shortest path length|DIJKSTRA(s, s")|in the state, "s"∈dsts"

(Transition Path Conversion Algorithm)

Input: start state "s0", and representative transition sequence "tin"=([t0],[t1], ... )
Output: transition sequence "tout"=(t0', t1', ... )
Procedure:
Step 1: initialization (C11 in the flowchart of FIG. 7)
s←start state, s0
todo←representative transition sequence, "tin"
tout←empty path
Step 2: select transitions (C12 and C13 in the FIG. 7 flowchart)
next←SELECT(the first one of "todo", s)
if a set "next" is empty, then to Step 3, else to Step 4

Step 3: connection by selection is impossible (C15 in the FIG. 7 flowchart)
   dsts←SOURCE (the first one in "todo")
   path←SHORTP (s, dsts)
   s←the destination state of path "path"
   tout←tout+path
else
Step 4: connection by selection is possible (C14 in the FIG. 7 flowchart)
   t←select one transition from transition set "next"
   s←the destination state of transition "t"
   todo←remove the head of "todo" and return the resulting list
   tout←tout+t
end if
Step 5: determination of termination (C16 in the FIG. 7 flowchart)
   if list "todo" is empty, then
   to Step 6
   else
   to Step 2
   end if
Step 6: output of the result
   output transition path "tout" and stop

EXAMPLE

Task Control Monitor

Determination of a path that covers the transitions in the contracted state transition diagram 24 (FIG. 4) with the representative transition path generator 13 using a known algorithm (see Document 1) results in the transition sequence shown in Table 7 of FIG. 14 (the representative transition path 25). This representative transition sequence is a consecutive path in the contracted state transition diagram 24 (FIG. 4), but is not always a consecutive path in the original state transition diagram (FIG. 3). In that case, it cannot serve as an executable test case as long as it is converted.

For example, a transition sequence along the representative transitions in the second path in Table 7 of FIG. 14 is t0→t6→t5→t15→t4→t1, but the destination and source states do not connect in a continuous manner in the original state transition diagram. For example, state "s1" and state "s6" have same state class, thus they are the same state in the contracted state transition diagram (FIG. 4) but are different states in the original state transition diagram (FIG. 3).

When the representative transition path 25 is not a consecutive path in the original state transition diagram (FIG. 3), the transition path converting unit 14 performs transition path conversion based on the representative transition path 25 to obtain a transition path 26 which is executable in the original state transition diagram. More specifically, the transition path converting unit 14 appropriately selects a transition from transitions belonging to each of transition classes of the representative transition path 25, respectively, and generates a transition path so that transition of the states is continuous in the original state transition diagram. When it cannot generate a transition path (or a sequence of transitions) that has continuous states only by selecting transitions, the transition path converting unit 14 makes states of the path continuous by utilizing an algorithm for calculating the shortest path (step 3 (C15 in FIG. 7)). That is, for a certain transition class which is disincentive for generation of a continuous path, the transition path converting unit 14 adopts a transition that starts from the destination state of a transition selected from transitions belonging to the immediately preceding transition class toward one of states included in the state class of the destination state of the certain transition class, and thereby gets the consecutive path.

Here, an operation of finding a transition path which is consecutive in the original state transition diagram based on a representative transition path in the contracted state transition diagram is named path conversion (or path reconstruction). The algorithm of path conversion (or path reconstruction) is as described above using FIG. 7.

The result of applying the path conversion or reconstruction algorithm with the transition paths of Table 7 in FIG. 14 and the initial state "s0" as inputs is shown in Table 8 of FIG. 15. The transition paths of Table 8 are transition paths obtained by selecting one transition from transitions belonging to each of the transition classes of Table 7 of FIG. 14 with the state "s0" as the initial state and are executable paths that are continuous in the original state transition diagram. The transition paths in Table 8 of FIG. 15 are the shortest test cases that meet the initially established test criterion: to cover all states and transitions between the states to the extent task identifiers are not distinguished.

In this way, the transition path converting unit 14 sequentially select each transition (i.e. second transition) of the representative transition path 25 in a traced order (i.e. an order by which each second transition are traced in the representative transition path generator 13). For each of each selected second transition, the transition path converting unit finds a first transition (a) which has same transition source state as one of states in a transition source group of the selected second transition and has same transition destination state as one of states in a transition destination group of the selected second transition and (b) which has same transition source state as a transition destination state of an immediately found first transition. It should be noted that the first transition is a transition included in the original state transition diagram 21, as stated above. The transition path converting unit 14 generates the transition path 26 which is a sequence of each found first transition.

As previously mentioned, when the first transition has not been found for one of the sequentially selected second transitions, the transition path converting unit 14 selects a first transition which has same transition source state as a transition destination state of the first transition found for an immediately preceding second transition of the one and has same transition destination state as one of states included in a transition destination group of the one. Thereby, the transition path converting unit 14 generates a transition path so that transition of the first states is continuous in the original state transition diagram.

According to the embodiment described above, the following advantages can be obtained.

There is no necessity to create a state transition diagram having a level of abstraction adapted for the purpose of a test, and it is also possible to prevent errors at the time of describing an equivalence relation (input of a relation that does not satisfy the reflexivity rule, symmetry rule, and transitivity rule) by using abstraction mapping of states instead of an equivalence relation between states.

Also, since the shortest path that covers a state space classified into equivalence classes through abstraction mapping is generated, an efficient test case with a desired coverage rate can be generated.

In addition, it is possible to automatically convert a transition path (i.e. representative transition path) in the contracted state transition diagram to a transition path in the original state transition diagram.

The test case generation apparatus may be implemented by using, for example, a general purpose computer device as basic hardware. Thus, the elements 11, 12, 13, 14 in FIG. 1 may be implemented by causing a processor provided in the above described computer device to execute a program. Then, the apparatus may be implemented by previously installing the above described program in the computer device or by installing the program in the computer device as needed. The program to be installed may be stored on a recording medium or a program storage medium such as a CD-ROM or distributed though a network.

What is claimed is:

1. A test case generation apparatus including a computer readable storage medium containing a set of instructions that cause a computer processor to perform a data analyzing process which generates a test case for a target system, comprising:
 a first input unit configured to input a state transition diagram of the target system, the state transition diagram representing first transitions between a plurality of states in the target system;
 a second input unit configured to input a mapping function that maps a given state to a value within a certain range;
 a grouping unit configured to map each of the states included in the state transition diagram with the mapping function to obtain a plurality of mapping values, and groups the states in the state transition diagram based on the mapping values by classifying the states having same mapping value into same group to generate a plurality of groups each including one or more states;
 a contracted state transition diagram generator configured to specify any two groups among the groups, set a second transition from one group of the two groups to the other group when there is at least one first transition from one of states included in the one group to one of states included in the other group, and by iterating these specifying and setting, generate a contracted state transition diagram that represents second transitions between the groups;
 a representative transition path generator configured to generate a representative transition path which is a sequence of the second transitions by tracing each second transition in the contracted state transition diagram starting from a predetermined group in a serial manner;
 a transition path converting unit configured to
 sequentially select each second transition in the representative transition path in a traced order,
 for each selected second transition, find a first transition which has same transition source state as one of states included in a transition source group of the selected second transition, has same transition destination state as one of states included in a transition destination group of the selected second transition and has same transition source state as a transition destination state of an immediately found first transition, and
 generate a transition path which is a sequence of each found first transition; and
 an output unit configured to output the transition path as the test case.

2. The apparatus according to claim 1, wherein
 when the second transition for which the first transition has not been found exists, the transition path converting unit selects a first transition which has same transition source state as a transition destination state of the first transition found for an immediately preceding second transition of the second transition and has same transition destination state as one of states included in a transition destination group of the second transition.

3. The apparatus according to claim 2, wherein
 the transition path converting unit generates the transition path so as to have a shortest path length.

4. A test case generation method performed in a computer apparatus including a computer readable storage medium containing a set of instructions that cause a computer processor to perform a data analyzing process which generates a test case for a target system, comprising:
 inputting a state transition diagram of the target system, the state transition diagram representing first transitions between a plurality of states in the target system;
 inputting a mapping function that maps a given state to a value within a certain range;
 mapping each of the states included in the state transition diagram with the mapping function to obtain a plurality of mapping values, and groups of the states in the state transition diagram based on the mapping values by classifying states having same mapping value into same group to generate into a plurality of groups each including one or more states;
 specifying any two groups among the groups, setting a second transition from one group of the two groups to the other group when there is at least one first transition from one of states in the one group to one of states included in the other group, and by iterating these specifying and setting, generating a contracted state transition diagram that represents second transitions between the groups;
 generating a representative transition path which is a sequence of the second transitions by tracing each second transition in the contracted state transition diagram starting from a predetermined group in a serial manner;
 sequentially selecting each second transition in the representative transition path in a traced order;
 for each selected second transition, finding a first transition which has same transition source state as one of states included in a transition source group of the selected second transition, has same transition destination state as one of states included in a transition destination group of the selected second transition, and has same transition source state as a transition destination state of an immediately found first transition;
 generating a transition path which is a sequence of each found first transition; and
 outputting the transition path as the test case.

5. The method according to claim 4, wherein
 when the second transition for which the first transition has not been found, the finding includes selecting a first transition which has same transition source state as a transition destination state of the first transition found for an immediately preceding second transition of the second transition and has same transition destination state as one of states included in a transition destination group of the second transition.

6. The method according to claim 5, wherein
 the transition path having a shortest path length is generated.

7. A program storage medium storing a computer program for causing a computer which generates a test case for a target system, to execute instructions to perform the steps of:
 inputting a state transition diagram of the target system, the state transition diagram representing first transitions between a plurality of states in the target system;
 inputting a mapping function that maps a given state to a value within a certain range;

mapping each of the states included in the state transition diagram with the mapping function to obtain a plurality of mapping values, and groups of the states in the state transition diagram based on the mapping values by classifying states having same mapping value into same group to generate into a plurality of groups each including one or more states;

specifying any two groups among the groups, setting a second transition from one group of the two groups to the other group when there is at least one first transition from one of states in the one group to one of states included in the other group, and by iterating these specifying and setting, generating a contracted state transition diagram that represents second transitions between the groups;

generating a representative transition path which is a sequence of the second transitions by tracing each second transition in the contracted state transition diagram starting from a predetermined group in a serial manner;

sequentially selecting each second transition in the representative transition path in a traced order;

for each selected second transition, finding a first transition which has same transition source state as one of states included in a transition source group of the selected second transition, has same transition destination state as one of states included in a transition destination group of the selected second transition, and has same transition source state as a transition destination state of an immediately found first transition;

generating a transition path which is a sequence of each found first transition; and outputting the transition path as the test case.

* * * * *